United States Patent Office 3,063,791
Patented Nov. 13, 1962

3,063,791
PREPARATION OF ALKALI AND ALKALINE EARTH METAL BOROHYDRIDES
Janos Kollonitsch, Salem, and Robert W. Bragdon, Marblehead, Mass., assignors to Metal Hydrides Incorporated, Beverly Mass., a corporation of Massachusetts
No Drawing. Filed Oct. 17, 1957, Ser. No. 690,603
11 Claims. (Cl. 23—14)

This invention relates to the preparation of alkali metal borohydrides, such as sodium and lithium borohydrides, and alkaline earth metal borohydrides, such as calcium borohydride.

The copending application of Janos Kollonitsch, Serial No. 683,953, filed September 16, 1957, which has matured into U.S. Patent 2,903,470, describes the reaction of aluminum hydride with the boric acid esters of alcohols having the formula ROH where R is a monovalent radical selected from the group consisting of alkyl, cycloalkyl, alkylene and an alkyl radical substituted with a halogen. The reaction is conducted in an ethereal reaction liquor at a temperature below the decomposition temperature of aluminum hydride but, preferably, at a temperature below normal room temperature. By this reaction a novel compound is produced, the reaction being illustrated by the equation:

$$4AlH_3 + 3B(OCH_3)_3 \rightarrow AlH_3(BH_3)_3[Al(OCH_3)_3]_3$$

The present invention is based upon the surprising discovery that when an alkali metal aluminum hydride, such as sodium or lithium aluminum hydride, or an alkaline earth metal aluminum hydride, such as calcium aluminum hydride, is reacted in an ethereal reaction liquor with a boric acid or a metaboric acid ester of an alcohol having the formula ROH where R is a radical as indicated above, the reaction proceeds in an entirely different manner. Thus, the products of the reaction are the alkali metal borohydride or the alkaline earth metal borohydride and an aluminum compound having the formula $Al(OR)_3$. The reaction of lithium aluminum hydride with trimethyl borate is illustrative and is represented by the equation:

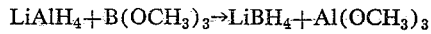

$$LiAlH_4 + B(OCH_3)_3 \rightarrow LiBH_4 + Al(OCH_3)_3$$

The temperature used in conducting the reaction is not critical, good results being obtained by bringing the reactants together at normal room temperatures and permitting the reaction to proceed without cooling.

The method used for separating the borohydride from the reaction liquor depends upon the composition of the borohydride, the composition of the reaction medium and the ester used as a reactant. For example, the reaction product having the formula $Al(OR)_3$ may be substantially insoluble, partially soluble or completely soluble in the reaction medium. If desired, the solvent may be removed by evaporation and the residue treated with a liquid which is a solvent for only one of the reaction products. If the compound having the formula $Al(OR)_3$ is substantially insoluble in the reaction medium it can be removed by filtration and the solvent removed from the filtrate by evaporation. Another method for separating the borohydride from the reaction liquor is sometimes applicable when both reaction products are in solution in the reaction liquor. For example, if the ether used is diethyl ether and the borohydride is lithium borohydride, dioxane may be added to the reaction liquor to precipitate lithium borohydride dioxanate which can be removed by filtration and then decomposed by heating in vacuo to recover lithium borohydride.

Illustrative of ethers which may be used in the practice of the invention are diethyl ether, tetrahydrofuran, dibutyl ether or the dimethyl or diethyl ethers of the diethylene glycols either alone or with hydrocarbon solvents, such as hexane, cyclohexane or benzene. When a mixture of an ether and a hydrocarbon solvent is used, the mixture should contain an amount of the ether sufficient to dissolve the metal aluminum hydride.

As illustrative of esters which may be used, we may mention isopropyl metaborate, ethyl borate, isopropyl borate, trihexyl borate, methyl borate, n-propyl borate, n-butyl borate, tertiary butyl borate, secondary butyl borate, n-amyl borate, tertiary amyl borate, methyl isobutyl carbinyl borate, 3-heptyl borate, di-isopropyl carbinyl borate, n-octyl borate, 2,6,8-trimethyl-4-nonyl borate, triallyl borate, oleyal borate, stearyl borate, 2-methyl-2,4-pentanediol borate, tribenzyl borate, tri-p-methyl benzyl borate, tri-o-methyl benzyl borate, tri-(2-phenyl cyclohexyl) borate, 1,3-dichloro-2 propyl borate, tricyclohexyl borate, tricyclopentyl borate and tricycloheptyl borate.

The invention is illustrated further by the following specific examples.

Example 1

A solution of 40 grams of lithium aluminum hydride in 425 ml. of diethyl ether was placed in a round bottom flask provided with a stirrer and reflux condenser and protected by an atmosphere of nitrogen. A solution of 110 grams of trimethyl borate in 100 ml. of tetrahydrofuran then was dropped into the flask gradually over a period of about 20 minutes with stirring and without cooling the flask. Then, 600 ml. of diethyl ether was added and the precipitate removed by filtration. The precipitate was washed three times with 100 ml. of tetrahydrofuran. The wash liquors were combined with the filtrate and evaporated in vacuo, the residue being dried at 200° C. at pressure of 1 mm. of mercury. The yield of lithium borohydride was 70 percent of theoretical. The product was recrystallized from t-butyl amine to obtain lithium borohydride of 98 percent purity.

Example 2

In a manner similar to that described in Example 1, a solution of 7.6 grams of lithium aluminum hydride in 132 ml. of diethyl ether was reacted with a solution of 53 ml. of triisopropyl borate in 100 ml. of diethyl ether. The aluminum isopropylate precipitated partially and this precipitate was removed by filtration. The filtrate was mixed with 15 ml. of dioxane to precipitate lithium borohydride dioxanate. The latter precipitate was removed by filtration and decomposed by heating in vacuo at 180° C. under a pressure of 1 mm. of mercury until a constant weight was obtained. The yield of lithium borohydride was about 70 percent and had a purity of about 73 percent. The impure lithium borohydride was purified by recrystallization.

Example 3

Under the conditions described in Example 1, a solution of 51.6 grams of isopropyl metaborate in 250 ml. of diethyl ether was reacted with a solution of 7.6 grams of lithium aluminum hydride in 132 ml. of diethyl ether. Then, 15 ml. of dioxane was mixed with the clear reaction liquor. The precipitated lithium borohydride dioxanate was removed by filtration and, after washing with diethyl ether, was decomposed by heating at 160° to 180° C. under a pressure of 1 mm. of mercury. 5 grams of lithium borohydride was obtained which, after recrystallization from t-butyl amine was 96 percent pure lithium borohydride. The yield was about 50 percent.

Example 4

Under the conditions described in Example 1, 5.4 grams of sodium aluminum hydride dissolved in 100 ml. of dry tetrahydrofuran was reacted with 26 ml. of isopropyl borate in 50 ml. of tetrahydrofuran. The white precipitate was removed by filtration and recrystallized from isopropyl amine. A yield of sodium borohydride of 64 percent was obtained.

Example 5

A mixture of 11 grams of methyl borate and 20 ml. of tetrahydrofuran was added to a solution of 17.4 grams of calcium aluminum hydride tetrahydrofuranate (0.1 mole) in 300 ml. of tetrahydrofuran under a nitrogen atmosphere at a temperature of 5° to 10° C. with stirring. After standing at room temperature over night, the precipitated aluminum methylate was filtered off and washed with tetrahydrofuran and the filtrate was evaporated to dryness in vacuo. The remaining crystals were dried at 50° C. under a pressure of 1 mm. of mercury to obtain the tetrahydrofuranate of calcium borohydride.

We claim:

1. The method of preparing a borohydride of a metal selected from the group consisting of alkali metals and alkaline earth metals which comprises mixing the aluminum hydride of the selected metal in an inert liquid reaction medium with an ester of an acid selected from the group consisting of boric acid and metaboric acid and an alcohol having the formula ROH where R is a monovalent radical selected from the group consisting of an alkyl, cycloalkyl, alkylene and an alkyl radical substituted with a halogen thereby forming a reaction liquor consisting essentially of a borohydride of the selected metal and an aluminum compound having the formula $Al(OR)_3$ in the reaction medium, and recovering the borohydride from the reaction liquor, said reaction medium containing an amount of an ether solvent for the aluminum hydride of the selected metal to dissolve the same.

2. The method of preparing an alkali metal borohydride which comprises mixing an alkali metal aluminum hydride in an inert liquid reaction medium with an ester of an acid selected from the group consisting of boric acid and metaboric acid and an alcohol having the formula ROH where R is a monovalent radical selected from the group consisting of an alkyl, cycloalkyl, alkylene and an alkyl radical substituted with a halogen thereby forming a reaction liquor consisting of essentially of an alkali metal borohydride and an aluminum compound having the formula $Al(OR)_3$ in the reaction medium, and recovering the alkali metal borohydride from the reaction liquor, said reaction medium containing an amount of an ether solvent for the alkali metal aluminum hydride to dissolve the same.

3. The method as claimed by claim 2 wherein the alkali metal aluminum hydride is lithium aluminum hydride.

4. The method as claimed by claim 2 wherein the alkali metal aluminum hydride is sodium aluminum hydride.

5. The method as claimed by claim 2 wherein the ester is a lower alkyl borate.

6. The method as claimed by claim 3 wherein the ester is a lower alkyl borate.

7. The mehod as claimed by claim 4 wherein the ester is a lower alkyl borate.

8. The method of preparing an alkaline earth metal borohydride which comprises mixing an alkaline earth metal aluminum hydride in an inert liquid reaction medium with an ester of an acid selected from the group consisting of boric acid and metaboric acid and an alcohol having the formula ROH where R is a monovalent radical selected from the group consisting of an alkyl, cycloalkyl, alkylene and an alkyl radical substituted with a halogen thereby forming a reaction liquor consisting essentially of an alkaline earth metal borohydride and an aluminum compound having the formula $Al(OR)_3$ in the reaction medium, and recovering the alkaline earth metal borohydride from the reaction liquor, said reaction medium containing an amount of an ether solvent for the alkaline earth metal aluminum hydride to dissolve the same.

9. The method as claimed by claim 8 wherein the alkaline earth metal aluminum hydride is calcium aluminum hydride.

10. The method as claimed by claim 8 wherein the ester is a lower alkyl borate.

11. The method as claimed by claim 9 wherein the ester is a lower alkyl borate.

References Cited in the file of this patent

UNITED STATES PATENTS

| 2,939,762 | Berner et al. | June 7, 1960 |

FOREIGN PATENTS

| 498,339 | Canada | Dec. 15, 1953 |
| 548,677 | Canada | Nov. 12, 1957 |
| 707,851 | Great Britain | Apr. 21, 1954 |
| 1,120,200 | France | Apr. 16, 1956 |

OTHER REFERENCES

Gaylord: "Reduction With Complex Metal Hydrides," 1956, page 49.

New Developments in the Chemistry of Diborane and the Borohydrides, by Schlesinger et al., J.A.C.S., vol. 75 (1953), pp. 186–190.

Wiberg: "New Results in Preparative Hydride Research," AEC–tr–1931 (AEC publication), April 8, 1954, pages 8 and 10–13.

Schechter et al.: "Boron Hydrides and Related Compounds," prepared under Contract NOa(s) 10992 for Dept. of Navy, Bureau of Aeronautics, prepared by Callery Chemical Co., printed March 1951, declassified December 1953, pages 20–22, 47, 74.

Shapiro et al.: "Journal of the American Chemical Society," vol. 74, pages 901–905 (1952).

Micovic et al.: "Lithium Aluminum Hydride in Organic Chemistry," 1955, pages 5, 135.